April 23, 1957
R. J. HICKIN
2,789,678
CONVEYOR SYSTEM
Filed June 4, 1954
6 Sheets—Sheet 1

INVENTOR
Robert J. Hickin
by
N. H. Finckel Jr.
ATTORNEY

April 23, 1957 R. J. HICKIN 2,789,678
CONVEYOR SYSTEM
Filed June 4, 1954 6 Sheets-Sheet 2

INVENTOR
Robert J. Hickin
BY
ATTORNEY

April 23, 1957 R. J. HICKIN 2,789,678
CONVEYOR SYSTEM
Filed June 4, 1954 6 Sheets-Sheet 5

INVENTOR
Robert J. Hickin
BY
ATTORNEY

April 23, 1957 R. J. HICKIN 2,789,678
CONVEYOR SYSTEM
Filed June 4, 1954

INVENTOR
Robert J. Hickin
BY
ATTORNEY

United States Patent Office 2,789,678
Patented Apr. 23, 1957

2,789,678

CONVEYOR SYSTEM

Robert J. Hickin, Seville, Ohio, assignor to The Ohio Boxboard Company, Rittman, Ohio, a corporation of Ohio Application June 4, 1954, Serial No. 434,599

27 Claims. (Cl. 198—19)

This application is a continuation-in-part of an application of the same title filed by applicant on July 16, 1951, Serial No. 236,896, now abandoned.

This invention relates to conveyor systems, and it has special reference to conveyor means for packaging line equipment whereby containers to be packed with a chosen commodity may be maintained automatically in uninterrupted adequate supply at a plurality of packing stations, but which functions to prevent supply in excess of what is needed at any such station.

In the particular practical application of the invention as illustrated in the drawings, but without limiting the scope of the invention thereto, the apparatus embodies a conveyor to which open-top cartons or trays are normally successively fed from a setting-up or erecting machine, this conveyor travelling past a plurality of packing stations each of which is furnished with a downwardly inclined chute or trough to which the cartons are supplied, or may fall by gravity, in uniform arrangement, to maintain at each station a supply adequate to meet the requirements of the operative thereat who successively fills the cartons with the commodity to be packaged. Should all the station chutes or troughs become filled, so that there would be an excess of cartons supplied by the erecting machine, means are provided for automatically interrupting the feeding influence of the conveyor on the cartons, and preferably also for interrupting the operation of the erecting machine and consequently of the feed of cartons therefrom to the conveyor. In such control of the feed of cartons by and to the conveyor, the chute or the like at the packing station most remote from the point of feed of cartons from the erecting machine onto the conveyor will function as a control station, and when, after interruption of the feed of cartons, a carton is removed from the chute of this control station, the normal feed of cartons will be reestablished, all as will be explained hereinafter more fully and finally claimed.

With the use of a conveyor system of this type it will be appreciated that the operative at each of the packing stations is furnished with a supply of cartons adequate for, but not in excess of, his needs, and that the supply of an excess of cartons by the conveyor, with possible jamming, crushing and wastage, will be avoided.

Moreover, the slanting or inclined arrangement of the chutes or troughs not only provides for gravity feed of the cartons at the several packing stations, but presents them open-side up in what has proved in practice to be a very convenient position for filling by the operative.

In the accompanying drawings illustrating the invention, in the several figures of which like parts are similarly designated.

Figure 1:
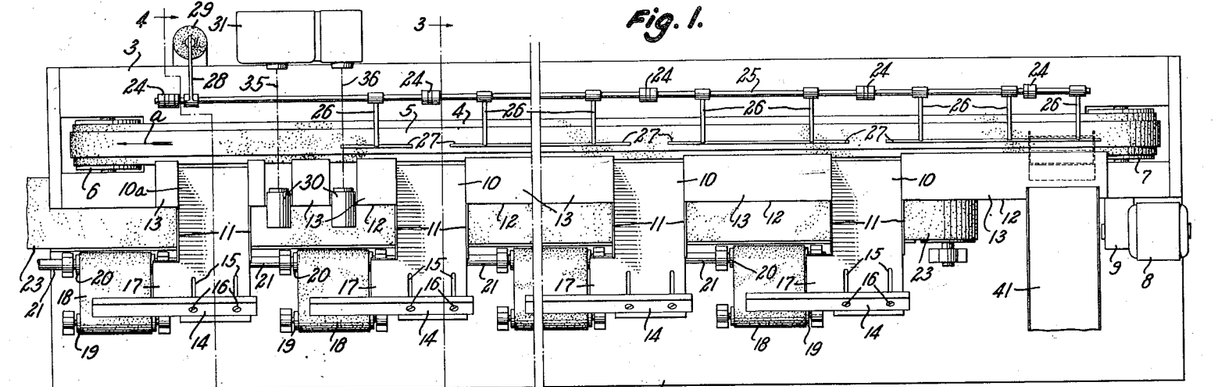
Fig. 1 is a plan view of one embodiment of the primary mechanical elements providing the conveyor system of the invention.
Figure 2:
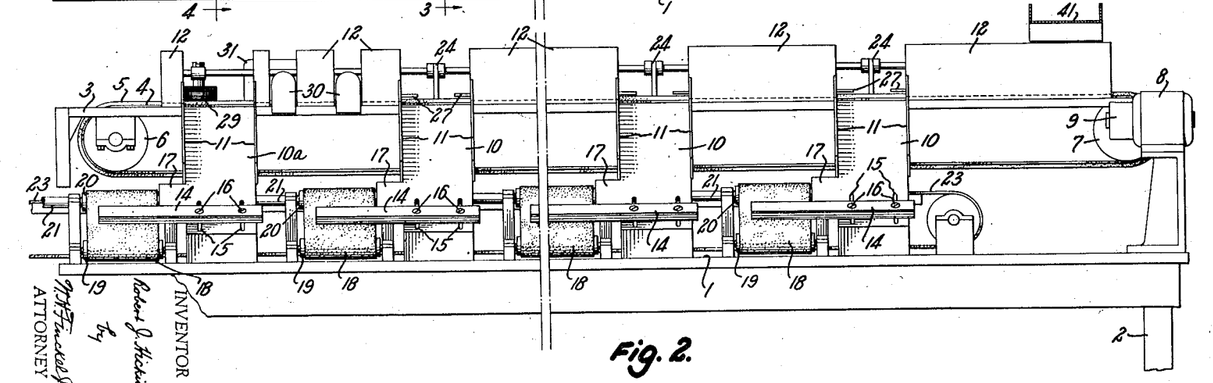
Fig. 2 is a front (operatives' station side) view of the parts shown in Fig. 1.

In the apparatus illustrated, which is representative as meeting the functional requirements of the invention, although not exclusive of other adequate embodiments, within the scope of the invention, and having reference particularly to Figs. 1 to 8, there is a table 1 to which supplies of the commodity to be packed may be furnished, supported at working height convenient for the operatives by frames or legs 2, Fig. 2. Elevated above this table at a predetermined height is a platform or runway 3 for a conveyor belt or belts 4, 4' each having a raised abutment-forming center portion 5, 5', and the belts 4, 4' will be carried by pulleys 6, 6' and 7, 7', one of which (7, 7' as shown) is driven by an electric motor 8, 8' and reducing gearing 9, 9'.

Figure 7:
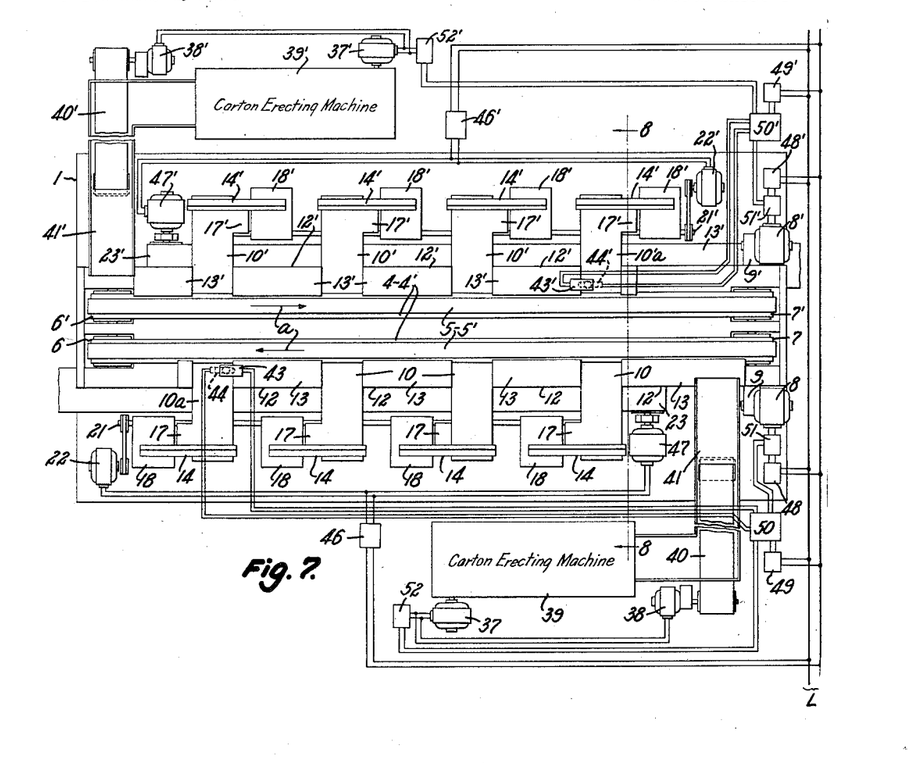
Fig. 7 is a view similar to Fig. 6, but showing a modified embodiment of electrical devices and the wiring therefor in combination with a double conveyor type of apparatus.

In spaced relation longitudinally of the belt or belts 4, 4'—5, 5', adequate to provide proper working spaces for the operatives at the packing stations thereby defined, are inclined, or downwardly slanting, chutes or troughs 10, 10', in such number as to provide the desired plurality of packing stations, the chute or trough 10a, 10'a nearest to the limit of travel of the belt or belts 4, 4'—5, 5' in the direction of the arrows a, Figs. 1 and 7, serving as control station means as will hereinafter appear.

The upper edges or ends of these chutes or troughs 10, 10' and 10a, 10'a meet the edge of the platform 3 in relatively close proximity to the adjacent edge of the belt or belts 4, 4'—5, 5', their lower ends preferably being supported by the table 1, and they are provided throughout a part of their length with side walls 11 which provide guides for the cartons deposited upon them by the belt or belts.

Between, and providing entrance openings for the troughs or chutes 10, 10', and 10a, 10'a, the platform 3 supports carton guides 12, 12' having slanting faces 13, 13' substantially normal to the surfaces of the chutes or troughs and the lower edges of which overlie the adjacent edge portions of belt or belts 4, 4' (see, for example, Figs. 1, 3, 7, 9 and 13). Thus, cartons supported by their bottom edges upon the belt or belts 4 will be maintained in tilted condition by the raised abutment means 5 thereof with their bottoms resting against the slanting faces 13, 13' of the guides 12, 12', see Figs. 3 and 4, and will be thus fed along by the belt or belts so that they may fall, openside up, upon the chutes or troughs 10, 10' and 10a, 10'a.

Each of the chutes 10, 10', 10a, 10'a is provided, respectively, with a stop bar 14, 14' adapted for fixed adjustment longitudinally of its chute by slot and bolt means 15 and 16, respectively, and each chute is provided, also, with an offstanding wing 17, 17'.

Figure 6:
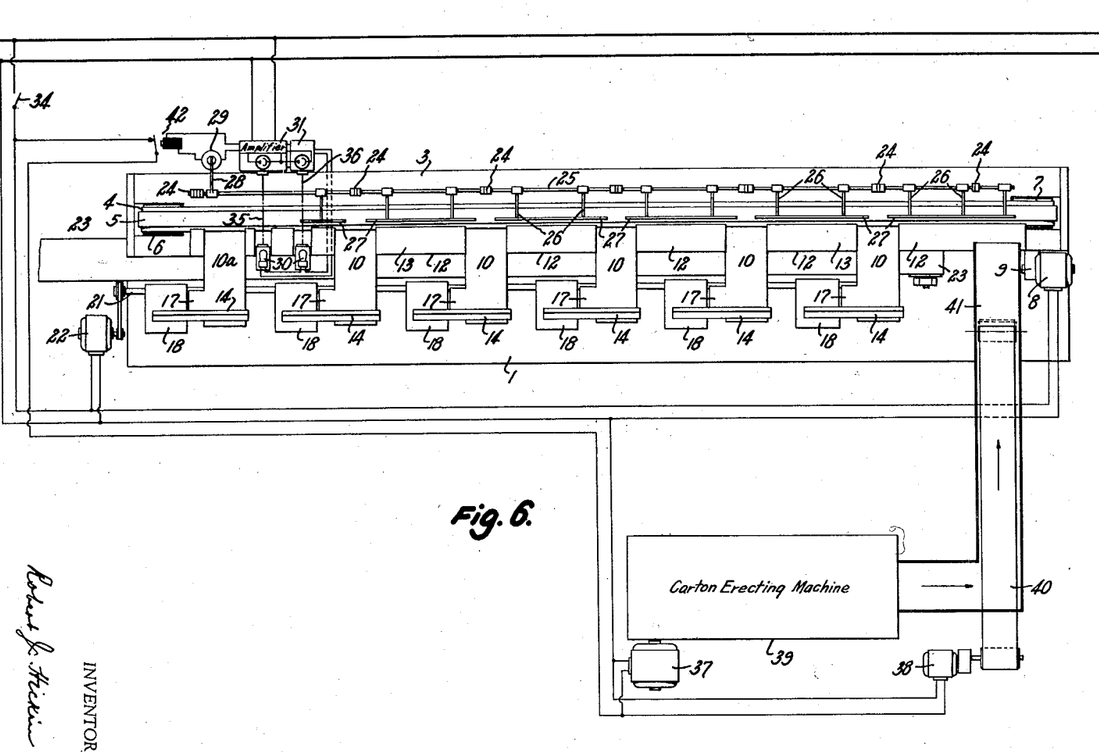
Fig. 6 is a schematic view similar to Fig. 1, and showing an operative embodiment of electrical devices for control of the system with appropriate circuit wiring therefor.

Adjacent to the outer edge of each of the wings 17, 17' is arranged a discharge conveyor 18, 18' carried by pulleys 19, 19' and 20, 20' the latter of which are connected with shaft means 21, 21' and electric drive means 22, 22' Figs. 6 and 7, and it will be seen that the stop bars 14, 14' extend over these discharge conveyors so that when cartons filled while on the chutes 10, 10', 10a, 10'a may be slid laterally over the wings 17, 17' and onto the discharge conveyors. From the discharge conveyors 18, 18' the filled cartons may be discharged onto appropriately supported and driven carrier belt means 23, 23' which may be individual means of the embodiment, as shown, or may be the lower, or return, run of the belt or belts 4, 4', obvious appropriate changes in design being made in the discharge conveyors 18, 18' in such latter case.

Figure 3:
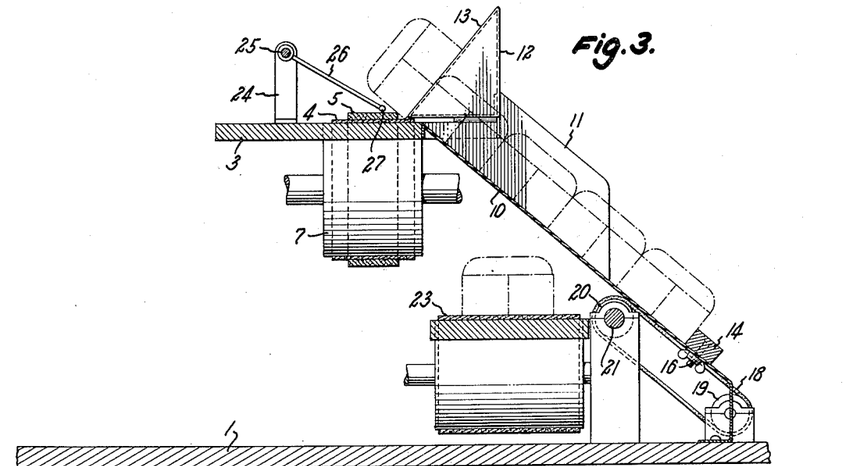
Fig. 3 is an enlarged sectional elevation taken on the line 3—3 of Fig. 1.
Figures 4, 5:
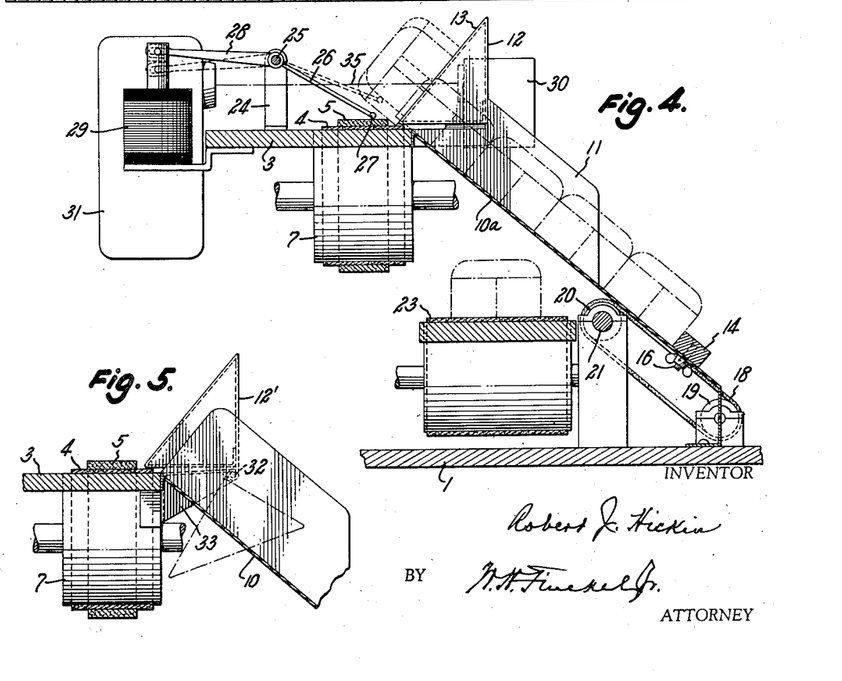
Fig. 4 is a view similar to Fig. 3, but taken on the line 4—4 of Fig. 1.
Fig. 5 is a fragmentary view similar to Fig. 3, but showing a modification.

As shown in Figs. 1 to 6, the platform 3 carries in bearing brackets 24 a longitudinal rock shaft 25 provided with lever arms 26 which carry a plurality (by preference) of trip bars 27 which, when in operative depressed position are out of contact with both the belt 4—5 and the side walls of the cartons carried by the belt, but when in elevated position serve to raise the cartons out of contact with the belt so that their advance thereby will be arrested. The actuation of these trip bars 27 in the manner described, and as indicated by the full and broken line positions, Fig. 4, is accomplished by means of an operating lever 28 fixed on the shaft 25 and operated by a solenoid 29 the circuit of which is responsive to photoelectric control means 30, 31 in a manner later to be described.

As shown in Figs. 1 to 4, the guides 12 are rigidly mounted upon the platform 3. If desired, however, in order to use the conveyor belt 4—5 as an ordinary conveyor for cartons or the like past the packing stations, the guides 12a may, as shown in Fig. 5, be provided with hinge connections 32 by which they are attached to brackets 33 secured to the platform 3, whereby they may be swung from positions above the platform to positions below the same, as indicated in full and dot-and-dash lines, respectively, Fig. 5.

The operation of the conveyor system of the embodiment shown in Figs. 1 to 6 is substantially as follows: Having reference to Fig. 6, it will be apparent that when the master switch 34 is closed and the beams of light 35 and 36 of the photo-electric control means are uninterrupted, the motors 8, 22, 37 and 38 will all be energized and will, respectively, drive the conveyor belt 4—5, the discharge conveyors 18, the carton erecting machine 39 and the feed belt 40 which latter moves the erected cartons onto, and causes their discharge from, the feed chute 41.

The erected cartons successively emerging from the erecting machine 39 will proceed onto the feed belt 40 of the feed chute 41 and will be successively discharged therefrom onto the conveyor belt 4—5 with their bottoms resting against the slanting surfaces 13 of the guide members 12 and their bottom side edges in contact with the conveyor belt 4, in which position they are maintained by the raised abutment 5 of the conveyor belt 4, as shown in broken lines, Fig. 1, and in dot and dash lines, Figs. 3 and 4. It will be understood that the frequency of discharge of cartons from the feed chute 41 and the linear speed of travel of the conveyor belt 4—5 are so timed that the cartons are arranged upon the belt in predetermined, substantially equally spaced, relation.

As the cartons are moved by the belt 4—5 along the guide members 12, supported by the slanting surfaces 13 thereof in unstable equilibrium, they will, upon reaching the openings defined by the guide members at the several locations of the packing stations 10 and 10a topple, by gravity, into the chutes thereat and successively pass, by gravity, down these chutes until arrested by the stop bars 14.

Obviously, the first carton entering each chute 10 or 10a will come to rest with its side wall in contact with the stop bar 14, and subsequently entering cartons will have their side walls in contact to form a column supported by the stop bar 14. When a predetermined plurality of cartons has entered the first chute encountered in their travel with the conveyor belt 4—5, the last one so entering will have the outer surface of its then upper side wall so positioned by appropriate adjustment of the stop bar 14 as to lie in the plane of the slanting surfaces 13 of the guide members 12 to provide, in effect, a continuation of these surfaces over which following cartons may pass to enter succeeding packing station chutes, as shown in Fig. 3.

The stop bar 14 of the final chute 10a at the control station is so adjusted, however, that the last carton entering that chute will have its end wall projecting outwardly from the plane of the slanting surfaces 13 of the guide members 12 so as to provide a stop for the next two successive cartons advanced by the belt 4—5, as shown in Fig. 4. The first carton thus stopped will break the beam of light 35 of the photo-electric control means 30—31, and the second carton thus stopped will break the beam of light 36 of such control means, and as a result the photo-electric control means will function to energize the solenoid 29 which will, through its connection with the lever 28, serve to oscillate the shaft 25 to raise the trip bars 27 and thus slide all cartons except that directly abutting the one offstanding from the control chute 10a upwardly upon the slanting surfaces 13 of the guide members 12 to separate them from driven contact with the belt 4—5 and arrest their progress.

In order to prevent an undue accumulation of cartons at the discharge end of the feed chute 41, and possible jamming of the mechanism and crushing of the cartons, there is preferably provided in the circuit for energizing the carton erecting machine motor 37 and the feed belt driving motor 38 a relay 42 responsive to energization of the solenoid 29, as shown in Fig. 6, whereby when this solenoid is energized the said motors 37 and 38 will be deenergized to interrupt the formation of cartons and their feed through the feed chute 41. However, the motors 8 and 22 which drive the conveyor belt 4—5 and discharge conveyors 18 are not deenergized and these conveyors, but particularly the conveyor belt 4—5, continue to travel.

When the operative at the control station fills and removes a carton from the final or control chute 10a, the other cartons will descend therein, and the first carton, movement of which with the conveyor belt 4—5 has been arrested by the carton projecting into its path from the chute 10a, will again travel with the conveyor belt 4—5 so that it is no longer in position to interrupt the beam of light 35 of the photo-electric control means, whereupon the solenoid 29 will be deenergized, the trip bars 27 depressed, the motors 37 and 38 of the carton erecting machine 39 and feed belt 40, respectively, reenergized, and normal operation of the system resumed.

In normal practice, the operatives at the several packing stations will fill the cartons nearest to them in the chutes 10 and 10a, that is to say the cartons resting against the stop bars 14, and when they are filled such cartons will be slid laterally over the wings 17 and onto the discharge conveyors 18 by which latter they are carried to and discharged upon the carrier belt 23 for travel to final packaging stations. Obviously as a filled carton is removed from one of the chutes 10, 10a and the empty cartons descend these chutes, space is left for reception of another carton from the conveyor belt 4—5 and thus a continuous supply of cartons is maintained at each packing station.

Figure 8:
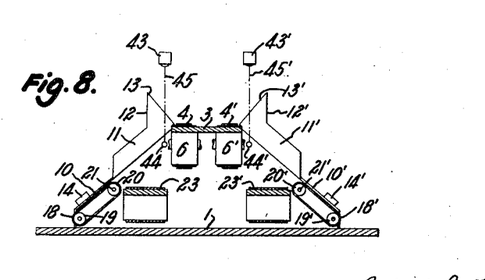
Fig. 8 is a schematic sectional view taken on the line 8—8 of Fig. 7, with some of the mechanism, electrical devices and wiring omitted.

It will be understood that instead of having chutes 10, 10a and packing stations at only one side longitudinally of the conveyor 4—5 and table 1, they might be substantially duplicated at the other side, with suitable similar controls, feed supply and the like, or, as shown in Figs. 7 and 8 either a single conveyor or two conveyors 4—5 and 4'—5', preferably travelling in opposite directions, may be employed, and also the control means may be modified so as to dispense with the trip bars 27 and their adjuncts.

In the modified embodiment illustrated in Figs. 7 and 8, in which two conveyor belts 4—5 and 4'—5', preferably travelling in opposite directions (see arrows a) are shown, the electrical motivating and control means are preferably duplicated for each conveyor belt in order that they may be put in service either separately or simultaneously.

Also, in the interest of simplification of the means for controlling the feeding and supplying of the cartons to the chutes 10, 10a, 10' and 10'a the travel of the cartons with the conveyor belt or belts is appropriately arrested upon completion of the complement of cartons in all of the chutes by arresting travel of the conveyor belts rather than by raising the cartons out of driven contact with such belt or belts as hereinbefore described.

To this end each of the control chutes 10a and 10'a is provided with an appropriate photoelectric couple including a light source 43, 43' and a photoelectric tube 44, 44', the normally projected light beams 45, 45' of which will pass through openings (not shown) in the bottoms of the chutes 10a, 10'a, respectively, so as to be interrupted by the last carton deposited in each of such chutes, the circuits for these couples being provided with time delay components serving to delay actuation of the controls for a time sufficient to accommodate the conveyor to normal operation even though the cartons finally deposited in such chutes will serve to break the beams 45, 45', as will now be explained in more detail.

Having reference particularly to Fig. 7, it will be seen that when the master switches 46, 46' which are connected across the line L are closed, the motors 22, 22' and 47, 47' will be energized to drive the discharge conveyor belts 18, 18' and the carrier belts 23, 23', respectively. Then the on-off, reversing switches 48, 48' for the motors 8, 8', which are preferably of reversible type, are closed to the position which will cause these motors to drive the conveyor belts 4—5, 4'—5' in the direction of the arrows a, respectively. Thereafter, the switches 49, 49' will be closed to energize the control units 50, 50', which are of similar nature, each including a transformer for supplying proper voltages for the photoelectric tubes 44, 44' and their respective light sources 43, 43', a multiple contact relay, and a time delay component for the circuits of the respective photoelectric couples. Included in the circuits of the motors 8 and 8' are relays 51, 51', respectively, responsive to the photoelectric couples, and similarly responsive relays 52, 52' are included in the circuits for the motors 37, 37' and 38, 38' which impart drive, respectively, to the carton erecting machines 39, 39', and the feed belts 40, 40' of the feed chutes 41, 41'. All of these control devices being of known form, per se, although their arrangement and mode of functioning are especially adapted to this particular installation, they have been indicated in Fig. 7 merely in block diagram form.

The sequence of closing of the several switches 46, 46', 48, 48' and 49, 49' is immaterial, but all of them must be closed in order for the two packaging lines to function properly, it being understood, of course, that these said switches for one of such packaging lines may be closed independently of those of the other line when only one line is to be put into operation.

With the several switches closed and the various elements of the system in operation, cartons delivered by the carton erecting machines 39, 39' to the feed belts 40, 40' will be fed thereby through the feed chutes 41, 41' to the conveyor belts 4—5, 4'—5' in properly supported condition against the faces 13, 13' of the guides 12, 12' and will progress toward and fall into the discharge chutes or troughs 10, 10a and 10', 10'a in the manner already described in reference to Fig. 6. It will be noted, here, that due to the presence of the time delay component included in each of the control units 50, 50' the momentary interruption of the light beams 45, 45' of the photoelectric couples at the control chutes 10a, 10'a by the entrance of cartons into those chutes will not cause the controls to function, and it is only when the control chutes are filled, and these light beams are interrupted for an appreciable length of time, namely that predetermined and for which the time delay components are set, that the controls will be caused to function.

Thus, when the light beams 45, 45' are thus interrupted for such predetermined time interval the following sequence of operations in the control circuits will occur. Closing of one set of normally open contacts of the relays in the control units 50, 50' will energize the solenoids of the relays 51, 51' to open their normally closed contacts and stop the motors 8, 8' and arrest travel of the belts 4—5 and 4'—5', thus stopping the feed of cartons therewith. Simultaneously, another set of normally open contacts of the relays in the control units 50, 50' will close to energize the solenoids of the relays 52, 52' and open the circuits of the motors 37, 37' and 38, 38' to interrupt both the operation of the carton erecting machines 39, 39' and the travel of the feed belts 40, 40' of the feed chutes 41, 41'.

Obviously, removal of a lower carton from the control chute 10a, 10'a will cause the uppermost carton in the chute to move downwardly therein out of the path of the light beam 45, 45', whereupon, when the light beam is thus non-interrupted, reestablishment of operation of the elements of the system will be effected.

This control, which embodies the arresting of travel of the conveyor belts 4—5, 4'—5', may be incorporated in the conveyor system where the last carton to enter the control chute 10a, 10'a projects into the path of travel of following advancing cartons, but it is not necessary for its effective functioning that an obstruction be thus provided by a projecting carton, it being obvious that, due to the incorporation of the time delay component in the circuit of the photoelectric control means, the failure of an operative to remove a carton from a control chute within the predetermined time for which such time delay component is adjusted will result in stoppage of feed of cartons by the arresting of travel of the conveyor belts 4—5, 4'—5'.

The modification of the chute means of the invention illustrated in Figs. 9 to 15 is provided for the purpose of insuring proper travel of cartons with the conveyor belt over the chute access openings in the face of the guide member when the chutes are filled, despite possible bow of the carton side walls which sometimes occurs and which can, though seldom does, result in inefficient functioning of the conveyor system.

The bow of cartons, having reference particularly to their side walls which, in the discharge chutes are in contact with each other, is not consistent. It may depend upon a number of factors, such as characteristics of the paperboard itself, the depth of the folding scores, the percentage of humidity in the atmosphere to which the cartons are subjected, etc. Obviously, the cartons will occupy more space longitudinally of the discharge chutes when their side walls are bowed outwardly than when they are flat and perpendicular to the bottoms.

It has been found in practice that with relatively few, say four, bowed cartons in a discharge chute their aggregate height in the chute is not sufficiently in excess of the distance from the pre-adjusted stop bar 14 to the face 13 of the guide 12 to operatively interfere with feed of cartons by the conveyor belt 4—5 over the uppermost carton in a filled chute. However, if relatively long chutes are used, and the number of cartons necessary to fill them is relatively large, say ten, the aggregate of the bows of the individual cartons may so extend their height lengthwise of the chute as to make the uppermost carton therein project sufficiently beyond the face 13 of the guide 12 to interfere with the travel of cartons therealong.

For example, if the bow of the side walls measured across the center of the carton from wall to wall is one-eighth of an inch, the aggregate increase in width of four cartons and hence of their height in the chute, would be one-half inch at the center of the upper side wall of the uppermost carton, and this variation from their predetermined height in the chute would not cause operational difficulties. However, the difference in height of one-and-one-quarter inches which would be produced by ten similarly bowed cartons would be prohibitive of effective operation of the system and would require readjustment of the stop bars 14 of the chutes.

It is, of course, possible to properly adjust the stop bars for a particular run of cartons having substantially the same bow characteristics, but as hereinbefore indicated the bow characteristics are rarely consistent and hence such adjustment cannot be fully depended upon, particularly in the presence of extreme atmospheric changes.

Hence, having reference to Figs. 9 to 15, it will be seen that means are provided whereby the width of one carton only need be considered, whether the carton walls are bowed or straight, in providing thereby a proper and effective continuation of the face 13 of the guide 12 at the gaps therein which give access to the discharge chutes.

To this end each of the chutes 10 is provided with a flanking dog-leg pocket the bottom 53 of which is in the plane of the bottom of the chute 10, and forms a continuation thereof, and the back wall 54 of which is preferably spaced from the face 13 of the guide 12 a distance slightly greater than the width of a carton to thus accommodate the pocket to bowed cartons. It will be noted (Figs. 13 and 14) that this dog-leg pocket is offset from the chute 10 preferably, though not necessarily, in the direction of approach of the cartons along the guide 12, and that its end wall 55 is spaced from the adjacent chute side wall 11 a distance somewhat greater than the length of a carton in order that some play of a carton within the pocket may be provided for. The gap in the guide 12 through which cartons may topple is opposite the dog-leg pocket, and the upper end of the chute 10 is closed by a thin wall 56 which may be formed as an extension of the face 13 of the guide 12.

Figures 9, 10, 11, 12:
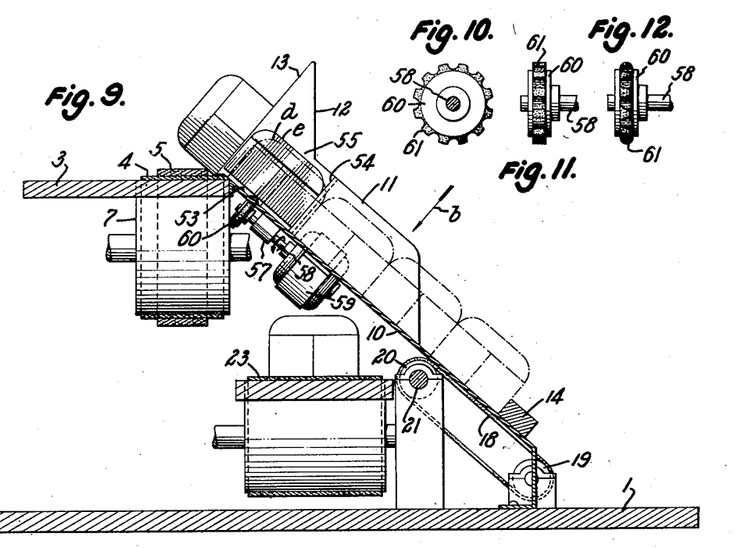
Fig. 9 is an enlarged sectional elevation (taken on the line 9—9 of Fig. 13) similar to Fig. 3, but illustrating a modification of the chute means and their appurtenances in which a dog-leg pocket is included.
Fig. 10 is an enlarged end view of one form of agitating and feeding roller for the dog-leg pockets of the chutes.
Fig. 11 is an edge view of one embodiment of the roller of Fig. 10.
Fig. 12 shows, in edge view, a further embodiment of such a roller.

Mounted in suitable bearings 57 beneath the bottom 53 of the dog-leg pocket upon the shaft 58 of a motor 59 constantly driven in the direction of the arrow c, Fig. 9, is a wheel or roller 60 preferably provided with a peripheral surface 61 of friction material, such as rubber, which extends upwardly through an opening 62 in the pocket bottom 53. The periphery of the roller 60 may take a variety of forms and is preferably serrated (Figs. 10 to 12) for a purpose to be explained.

Figure 13:
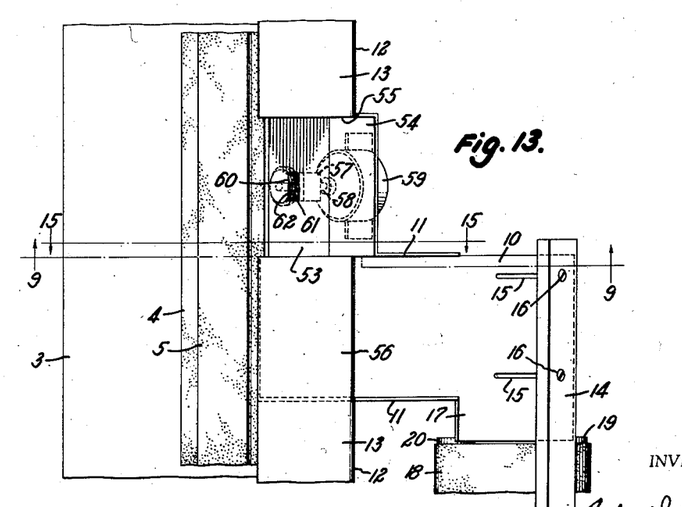
Fig. 13 is a top plan view of the operative parts shown in Fig. 9.
Figure 14:
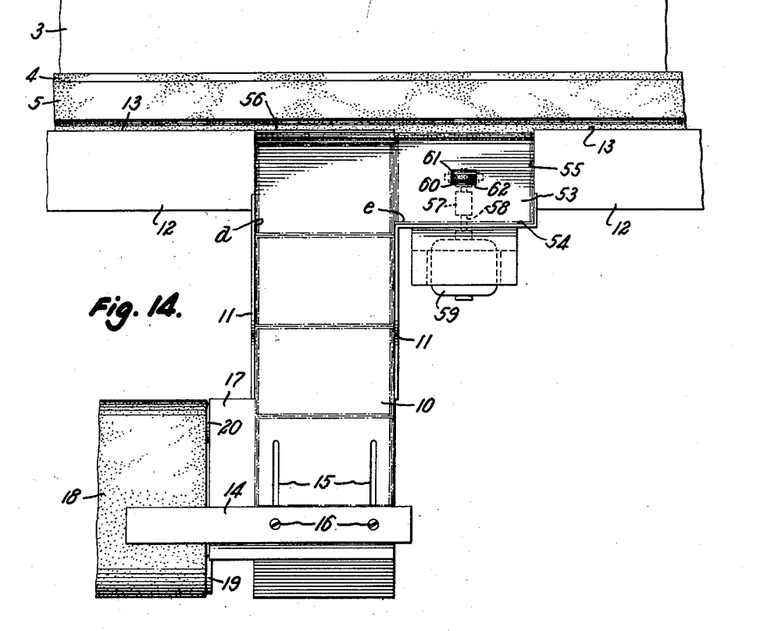
Fig. 14 shows the parts illustrated in Fig. 9 and viewed in the direction of the arrow $b$ of Fig. 9.
Figure 15:
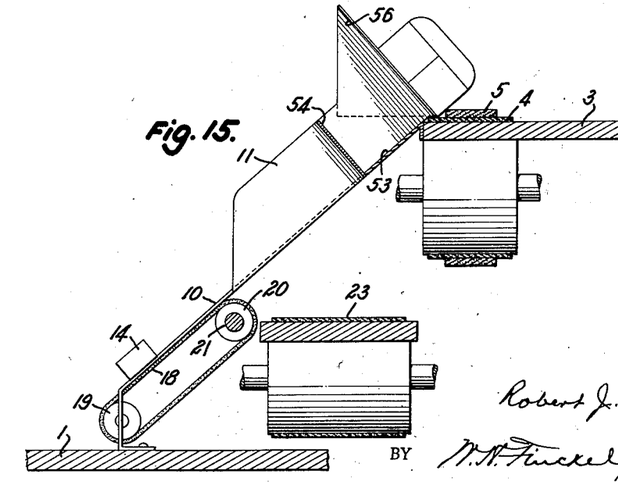
Fig. 15 is a sectional elevation taken on the line 15—15, Fig. 13.

With this arrangement it will be apparent that cartons toppling into the dog-leg pocket so as to rest upon its bottom and upon the travelling periphery 61 of the roller 60 will successively be projected under the wall 56 and into the chute 10 until a full complement of cartons fills the chute supported therein by the stop bar 14 with the uppermost carton d, Figs. 9 and 13, projecting past the back wall 54 of the dog-leg pocket. Obviously, with a carton d in this position no more cartons can enter the chute from the dog-leg pocket until a carton is removed from the lower portion of the chute, and therefore the last carton e to enter the dog-leg pocket will remain therein with its upwardly disposed side wall furnishing a substantial continuation of the face 13 of the guide 12 to support following cartons as they pass over the gap in their progress to other dog-leg pockets and chutes.

It will be noted that with the carton e in the dog-leg pocket forced by the roller 60 against the carton d uppermost in the chute 10, the carton d will have a tendency to resist descent of the chute 10 under the influence of gravity. However, by providing the periphery 61 of the roller with serrations, its driving effect upon the carton e is, in a sense, intermittent, and provides for agitation of the carton by imparting to it a jigging movement which, due to the greater length of the dog-leg pocket, makes it possible for the carton e to intermittently abut against and retreat from the carton d, thus enabling the carton d to descend by gravity in the chute 10.

Although the invention has been described in its preferred embodiments, and in its particular application to the handling of cartons, it will readily be understood that in principle it may be adapted for service with articles other than cartons, and various changes and modifications are considered to be within the principle of the invention and the scope of the following claims.

What I claim is:

1. In a conveyor system, including a travelling conveyor adapted to support and advance a succession of similar articles, guide means flanking said conveyor and having a surface arranged at an obtuse angle to said conveyor, said surface contactively supporting said articles by a chosen one of their faces which rests against it and in a condition of unstable equilibrium for travel during their advance by said conveyor, a plurality of discharge openings in said guide means, individual chute means adjacent to said several openings and adapted to receive and to support upon said chosen faces articles angularly toppling by gravity from said conveyor through said openings as they register therewith during their travel, and means associated with said chute means and serving upon the discharge of predetermined numbers of articles from said conveyor through the several discharge openings to position a trailing face of the article last so discharged at a particular chute in substantial alignment with the article-contacting surface of said guide means, whereby successive articles advanced by said conveyor may travel therewith upon said guide means past said discharge openings.

2. A conveyor system as claimed in claim 1, in which the means associated with said chute means to position a trailing face of the article last discharged comprises a pocket flanking said chute means and of a size to receive only one of said articles, said pocket having a wall serving to position the trailing face of said article in the manner defined.

3. A conveyor system as claimed in claim 2, in which said pocket is provided with means serving to impart agitation to the article therein.

4. A conveyor system as claimed in claim 3, in which the agitation imparting means include a driven member contactively engageable with the article.

5. A conveyor system as claimed in claim 4, in which the driven member is a rotating wheel having its peripheral edge extending into the pocket.

6. A conveyor system as claimed in claim 5, in which the peripheral edge of the wheel is provided with roughening means.

7. In a conveyor system, including a travelling conveyor adapted to support and advance a succession of similar articles, guide means flanking said conveyor and having a surface arranged at an obtuse angle to said conveyor, said surface contactively supporting said articles upon a chosen one of their faces which rests against it and in a condition of unstable equilibrium for travel during their advance by said conveyor, a plurality of discharge openings in said guide means, individual chute means communicating with the several openings, said chute means adapted to receive and to support upon said chosen faces articles angularly toppling by gravity through said openings as they register therewith during their travel, and stop means associated with said chute means and serving upon the discharge of predetermined numbers of articles from said conveyor through the several discharge openings onto said individual chute means to position a trailing face of the article last so discharged to a particular chute in alignment with the article-contacting surface of said guide means, whereby successive articles advanced by said conveyor may travel therewith upon said guide means past said discharge openings.

8. A conveyor system as claimed in claim 7, in which the stop means are adjustable upon the chute means with respect to the article-contacting surface of the guide means, whereby to insure substantial planar coincidence of the said trailing faces of the discharged articles with respect to said article-contacting surface.

9. In a conveyor system, a travelling conveyor adapted to contactively support and advance a succession of articles for discharge from the conveyor at a plurality of stations for handling, the last station in the direction of advance of said conveyor constituting a control station, means at said control station for receiving from the conveyor a predetermined number of said articles, means at each of said stations in advance of said control station for successively receiving from the conveyor a predetermined number of said articles at each such station prior to completion of the complement of articles at the receiving means of said control station, and means operative upon completion of the complement of articles at the receiving means of said control station for arresting the advance of all articles by the conveyor.

10. A conveyor system as claimed in claim 9, in which the means for arresting the advance of articles by said conveyor comprise means for interrupting travel of the conveyor.

11. In a conveyor system, a travelling conveyor adapted to contactively support and advance a succession of articles to a station for handling, means for successively feeding articles to said conveyor, means at said station for successively receiving from said conveyor a predetermined number of said articles, means operative upon the completion of the complement of articles at said receiving means for arresting the advance of all articles by the conveyor, and means operable upon operation of said arresting means for effecting a cessation of feed of articles to said conveyor by said feeding means.

12. In a conveyor system, an electric motor driven travelling conveyor adapted to contactively support and advance a succession of articles to a station for handling, electrically operated means for successively feeding articles to said conveyor, means at said station for successively receiving from said conveyor a predetermined number of said articles, means, including photoelectric control means in circuit with said motor and said electrically operated means and responsive to a predetermined association of articles at said station, and operative upon completion of the complement of articles at said station in said receiving means, for interrupting the circuit through said motor to arrest the advance of all articles by said conveyor, and means responsive to actuation of said photoelectric control means for interrupting the circuit through said electrically operated means to arrest the feed of articles to said conveyor by said feeding means.

13. In a conveyor system, a travelling conveyor adapted to contractively support and advance a succession of articles fed thereto, guide means bordering one edge of said conveyor and stationary with respect thereto and serving normally to hold the articles advanced by the conveyor in a condition of unstable equilibrium, a plurality of chutes having entrance edges adjacent to said edge of the conveyor, said guide means being interrupted at and throughout the extent of said several chute edges to provide openings through which the articles may fall by gravity onto the chutes, the last chute in the order of advance of said articles constituting a control station, each of said chutes being adapted to receive only a predetermined number of the articles whereby it is filled, stop means associated with each of said chutes and serving to limit the movement of articles thereon in a direction away from said conveyor edge and hence from said guide means, the stop means on the chute constituting said control station being arranged to cause an article on the chute to offstand beyond the article-contacting surface of said guide means thus forming an obstruction extending into the path of advance of the articles on said conveyor and in contact with said guide means, and the stop means of the other chutes being arranged to cause articles therein to substantially align with the plane of said article-contacting surface whereby other articles advanced by the conveyor may pass openings in said guide means, and means operable in response to stoppage of articles on the conveyor by said obstruction-forming article for arresting advance of all articles by the conveyor.

14. A conveyor system as claimed in claim 13, in which the means for arresting the advance of articles by said conveyor comprises means for interrupting travel of the conveyor.

15. In a conveyor system providing a plurality of packing stations for cartons to be filled with salable commodities, a travelling conveyor adapted to contactively support and advance a succession of empty cartons, guide means bordering one edge of said conveyor and provided with a surface arranged at an obtuse angle to said conveyor and with which the bottoms of the cartons are in contact, said guide means serving normally to hold the cartons advanced by the conveyor in a condition of unstable equilibrium, a plurality of chutes having entrance edges adjacent to said edge of the conveyor, said guide means being interrupted at and throughout the extent of said several chute edges to provide openings through which cartons advanced by said conveyor may topple by gravity from the guide means so that their bottoms will rest upon the chutes, the last chute in the order of advance of the cartons constituting a control station, each of said chutes being provided with means to arrest the travel thereon away from said conveyor edge of cartons falling thereon whereby each chute may be filled by a predetermined number of cartons in wall to wall contact, each chute except that of the control station being adapted to present a wall of the last carton to fall thereon in alignment with the said contacting surface of the guide means so that subsequently advanced cartons may pass thereover for introduction to successive chutes in the order of advance of the cartons, and said control station chute when filled presenting a wall of the last carton falling thereon offstanding from the plane of said contacting surface and into the path of advance of other cartons on the conveyor, whereby when all chutes are filled an advancing carton will be arrested by said offstanding wall, and means operable in response to the arrest of said advancing carton for arresting advance of all other advancing cartons by said conveyor.

16. In a conveyor system, a continuously travelling conveyor adapted to contractively support and advance a succession of articles to a station for handling, means at said station for successively receiving from said conveyor a predetermined number of said articles, and means operative upon completion of the complement of articles at said receiving means for interrupting the contact with the conveyor of all articles thereon approaching said receiving means to thereby arrest their advance with the conveyor toward said station.

17. In a conveyor system, a continuously travelling conveyor adapted to contactively support and advance a succession of articles for discharge from the conveyor at a plurality of stations for handling, the last station in the direction of advance of said conveyor constituting a control station, means at each of said stations for successively receiving from the conveyor a predetermined number of articles at each station, and means operative upon completion of the complement of articles at the receiving means of said control station for interrupting the contact with the conveyor of all articles thereon to thereby arrest their advance with the conveyor toward said control station.

18. In a conveyor system, a continuously travelling conveyor adapted to contactively support and advance a succession of articles to a station for handling, means for successively feeding articles to said conveyor, means at said station for successively receiving from said conveyor a predetrmined number of said articles, means operative upon the completion of the complement of articles at said receiving means for interrupting the contact with the conveyor of all articles thereon to thereby arrest their advance with the conveyor toward said station, and means operable upon operation of said interrupting means for effecting a cessation of feed of articles to said conveyor by said feeding means.

19. In a conveyor system, a continuously travelling conveyor adapted to contactively support and advance a succession of articles to a station for handling, means at said station for successively receiving from said conveyor a predetermined number of articles, and means, including photoelectric control means responsive to a predetermined association of articles upon said conveyor, operative upon completion of the complement of articles at said station in said receiving means for interrupting the contact with said conveyor of all articles thereon to thereby arrest their advance toward said station.

20. In a conveyor system, a continuously travelling conveyor adapted to contactively support and advance a succession of articles to a station for handling, means for successively feeding articles to said conveyor, means at said station for successively receiving from said conveyor a predetermined number of said articles, means, including photoelectric control means responsive to a predetermined association of articles on said conveyor, operative upon completion of the complement of articles at said station in said receiving means for interrupting the contact with said conveyor of all articles thereon to thereby arrest their advance toward said station, and means responsive to actuation of said photoelectric control means for interrupting feed of articles to said conveyor by said feeding means.

21. In a conveyor system, a continuously travelling conveyor adapted to contactively support and advance a succession of articles fed thereto, guide means bordering one edge of said conveyor and stationary with respect thereto and having an article-contacting surface serving normally to hold the articles advanced by the conveyor in a condition of unstable equilibrium, a chute having an entrance edge adjacent to said edge of the conveyor, said guide means being interrupted at and throughout the extent of said entrance edge to provide an opening through which the articles may fall by gravity from said conveyor onto said chute, said chute being adapted to receive only a predetermined number of articles whereby it is filled, and means operative upon completion of the complement of articles on said chute for interrupting the contact with the conveyor of all articles thereon to thereby arrest their advance toward said chute.

22. In a conveyor system, a continuously travelling conveyor adapted to contactively support and advance a succession of articles fed thereto, guide means bordering one edge of said conveyor and stationary with respect thereto and serving normally to hold the articles advanced by the conveyor in a condition of unstable equilibrium, a plurality of chutes having entrance edges adjacent to said edge of the conveyor, said guide means being interrupted at and throughout the extent of said several chute edges to provide openings through which the articles may fall by gravity onto the chutes, the last chute in the order of advance of said articles constituting a control station, each of said chutes being adapted to receive only a predetermined number of the articles whereby it is filled, stop means associated with each of said chutes and serving to limit the movement of articles thereon in a direction away from said conveyor edge and hence from said guide means, the stop means on the chute constituting said control station being arranged to cause an article on the chute to offstand beyond the article-contacting surface of said guide means thus forming an obstruction extending into the path of advance of the articles on said conveyor, and the stop means of the other chutes being arranged to cause articles therein to align with the plane of said article-contacting surface whereby other articles advanced by the conveyor may pass openings in said guide means, and means operable in response to stoppage of articles on the conveyor by said obstruction-forming article for interrupting contact of articles with the conveyor to thereby arrest their advance.

23. In a conveyor system providing a plurality of packing stations for cartons to be filled with salable commodities, a continuously travelling conveyor adapted to contactively support and advance a succession of empty cartons, guide means bordering one edge of said conveyor and provided with a carton contacting surface serving normally to hold the cartons advanced by the conveyor in a condition of unstable equilibrium, a plurality of chutes having entrance edges adjacent to said edge of the conveyor, said guide means being interrupted at and throughout the extent of said several chute edges to provide openings through which cartons advanced by said conveyor may fall by gravity from the conveyor onto the chutes, the last chute in the order of advance of the cartons constituting a control station, each of said chutes being provided with means to arrest the travel thereon away from said conveyor edge of cartons falling thereon whereby each chute may be filled by a predetermined number of cartons in wall to wall contact, each chute except that of the control station being adapted to present a wall of the last carton to fall thereon in alignment with the said contacting surface of the guide means so that subsequently advanced cartons may pass thereover for introduction to successive chutes in the order of advance of the cartons, and said control station chute when filled presenting a wall of the last carton falling thereon offstanding from the plane of said contacting surface and into the path of advance of other cartons on the conveyor, whereby when all chutes are filled an advancing carton will be arrested by said offstanding wall, and means operable in response to the arrest of said advancing carton for interrupting contact of other advancing cartons with said conveyor, whereby the advance of all cartons on the conveyor will be arrested.

24. A conveyor system as claimed in claim 23, in which means are provided for automatically successively feeding cartons to said conveyor, including means responsive to the actuation of said carton advance arresting means for interrupting such successive automatic feeding.

25. A conveyor system as claimed in claim 23, in which the means operable in response to the arrest of said advancing carton includes photo-electric control means the operation of which is initiated by the arrest of said carton.

26. A conveyor system as claimed in claim 23, in which means are provided for automatically successively feeding cartons to said conveyor, and in which the means operable in response to the arrest of said advancing carton includes photo-electric control means the operation of which is initiated by the arrest of said carton, means responsive to the operation of said photo-electric control means for interrupting the said automatic successive feeding of cartons to said conveyor.

27. A conveyor system as claimed in claim 26, in which the automatic carton feeding means include electric motors and circuits for supplying current thereto, and the means for interrupting the said automatic feeding of cartons to the conveyor include a relay controlling said circuits and operable in response to operation of said photo-electric control means.

References Cited in the file of this patent

UNITED STATES PATENTS

| | | |
|---|---|---|
| 2,298,829 | McCann | Oct. 13, 1942 |
| 2,405,805 | Albertoli | Aug. 13, 1946 |